Figure 1:
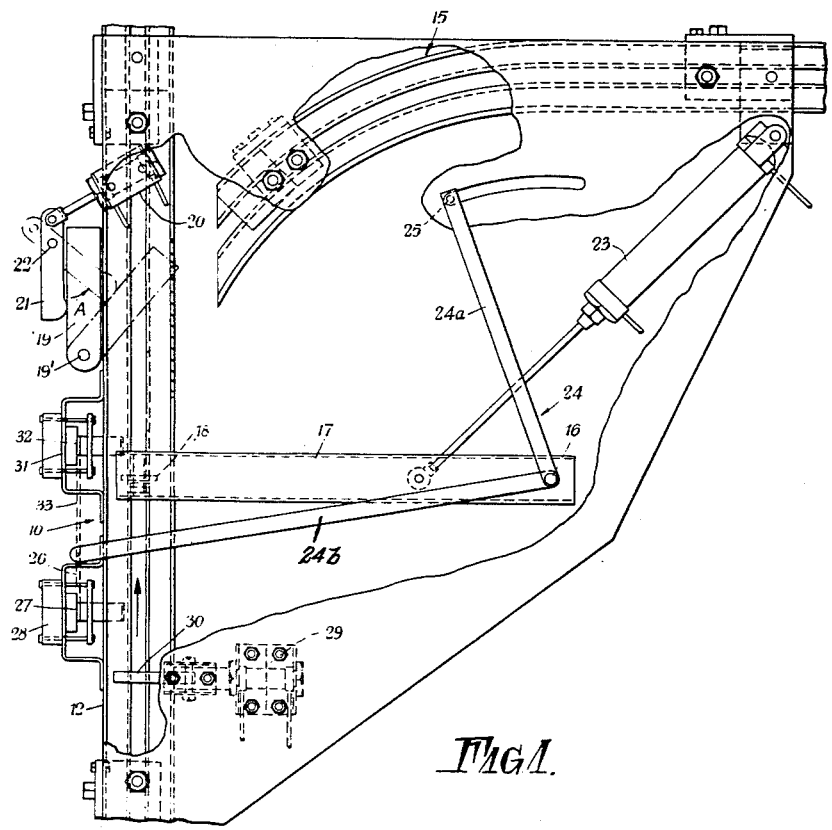

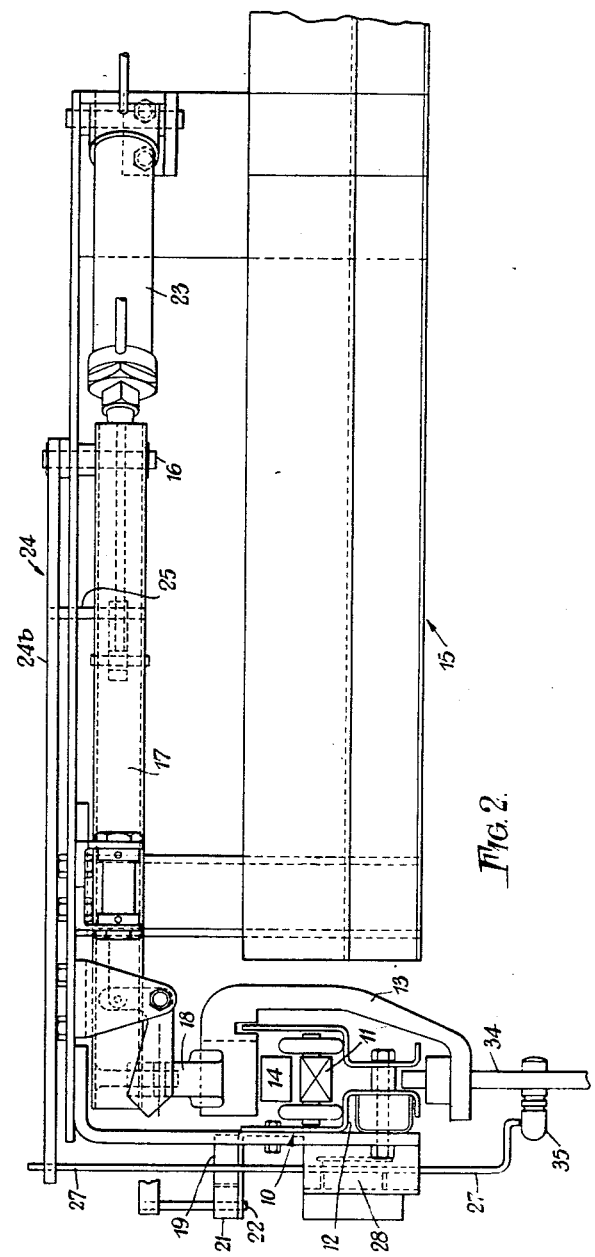

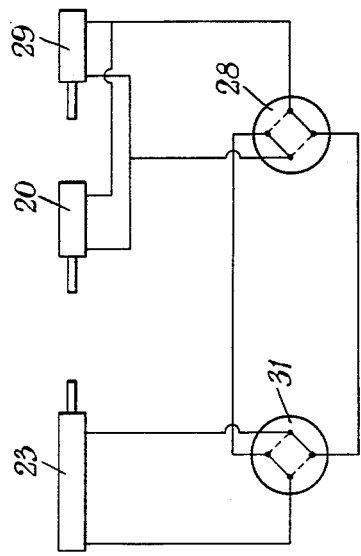
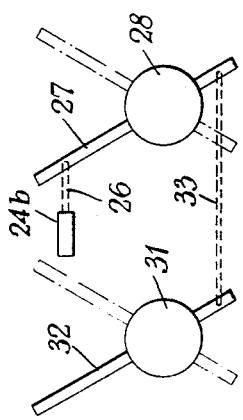
FIG. 4.
FIG. 3.

United States Patent Office 2,940,401
Patented June 14, 1960

2,940,401

CONVEYOR SYSTEMS

Arthur Thomas Charles Burrows, Stevenage, England, assignor to Geo. W. King Limited, Stevenage, England, a British company Filed July 22, 1958, Ser. No. 750,199

Claims priority, application Great Britain July 24, 1957

6 Claims. (Cl. 104—137)

This invention relates to conveyor systems and more particularly to such systems of the kind wherein load carriers are positioned on an endless driven chain and are propelled along by the latter by virtue of the friction subsisting between said carriers and the chain, the arrangement being such that any carrier may be stopped at any time without in any way interrupting or interfering with the continued movement of the chain.

It is the chief object of the invention to provide in a system of the kind referred to means whereby load carriers may be diverted from one endless driven chain constituting a main conveyor line to a branch or subsidiary conveyor line.

According to the invention in a conveyor system of the kind set forth and including a branch conveyor line arranged to diverge from the normal path of travel of the load carriers at a preselected point along such path there is provided in the region of such point a switch device which is adapted on actuation to be projected into the path of any selected load carrier or trolley travelling along the said normal path towards said junction, there also being an angularly movable transfer member adapted on actuation to apply a propulsive effort to the selected carrier or trolley, the arrangement being such that as the carrier or trolley is propelled forwardly by said transfer member into contact with the switch device the latter will be effective to guide or divert said carrier so that it will pass on to the branch conveyor line.

In order that the said invention may be clearly understood and readily carried into effect the same will be hereinafter more fully described with reference to the accompanying drawings in which:

Figure 1 is a plan view of a switch device for transferring load carrying trolleys from a main conveyor line to a branch, part of the top plate of the operative mechanism being cut away to permit of better illustration, Figure 2 is an end elevational view, Figure 3 is a diagrammatic view illustrating the manner in which control valves incorporated in the mechanism shown in Figures 1 and 2 are operated, Figure 4 is a diagram of the air circuit incorporated in the mechanism shown in Figures 1 and 2.

Referirng to the drawings 10 generally denotes a main conveyor line comprising an endless driven chain 11 of known type which is disposed within a track 12 of channel section. In known manner load carriers or trolleys (one of which is indicated at 13, Figure 2) are disposed on the chain 11 and are conveyed along by the latter due to the friction subsisting between the chain and said carriers or trolleys. In accordance with the usual practice the chain will preferably incorporate a plurality of rollers (one of which is indicated at 14, Figure 2) which project upwardly from the upper surface thereof and serve actually to support the trolleys or carriers.

At a selected point along such a main conveyor line a branch conveyor designated generally by 15 is provided, which conveniently comprises an endless driven chain of a type similar to that employed in the main conveyor, being so arranged as to diverge from the main conveyor along an arc or curve at least for the initial part of its path of travel from said main conveyor.

Disposed for pivotal movement about a vertical axis 16 coincident with the centre of curvature of the branch conveyor is a transfer arm 17, such arm being disposed at a level above the conveyors and carrying at or adjacent its outer or free end a pivoted pusher dog or driving abutment 18 which is adapted in the initial or normal position of the arm to depend into the path of any trolley or carrier passing along the main conveyor 10. The arrangement is such that the driving dog or abutment 18 will pivot idly on being contacted by any trolley or carrier passing along the main conveyor and will allow the latter to pass whereafter it will swing back into position behind such trolley or carrier and will be effective on a forward or operative stroke of the transfer arm 17 positively to propel the trolley or carrier on to and along the initial part of the branch conveyor as will be hereinafter more fully described.

Suitably positioned adjacent the main conveyor and in the region of the junction with the branch conveyor is a switch device 19, such device being mounted for pivotal movement about a pivot 19' from an inoperative position alongside the main conveyor to an operative position indicated in dotted lines wherein it will extend across the latter in the path of any on-coming trolley or carreir and will be effective to divert the latter on to the branch conveyor.

In order to actuate the switch device 19 a pneumatically operated ram 20 is provided such ram being coupled to an actuating lever 21 which is pivoted at 22 and is adapted to cooperate with said switch device 19 the arrangement being such that on supply of air or other working fluid to the ram 20 it will be effective to move said lever 21 from its inoperative position and in the direction of the arrow A. The lever 21 is adapted on actuation to contact the switch device 19 and to move it into its operative position wherein it will project across the top of the main conveyor. The arrangement is such that when the lever 21 is in its fully operative position it will be in a dead centre position substantially at right angles to the switch device 19 and will thus hold the latter effectively against any possibility of undesired displacement. The transfer arm 17 is adapted to be actuated by means of a second pneumatically operated ram 23 the arrangement being such that on supply of working fluid to the ram 23 the arm 17 will be caused to swing from its initial or normal position shown in Figures 1 and 2 wherein it projects across the main conveyor through a predetermined arc so that the pusher dog or abutment 18 carried thereby will be effective positively to propel a load carrier or trolley on to the branch conveyor 15. Mounted for free pivotal movement about the axis 16 is a re-setting lever 24 having arms 24a and 24b. The arm 24a carries a depending peg 25 at its outer or free end while the arm 24b is coupled by means of a chain or the like indicated at 26 to the actuating arm 27 of a valve 28 which is disposed adjacent the main conveyor 10 and is adapted to control the supply of working fluid e.g. air, to the ram 20 and also to a second ram 29 adapted to effect operation of a back stop 30. The operation of the ram 23 is controlled by means of a second valve 31 which is also disposed adjacent the conveyor 10 and is provided with an actuating arm 32 which latter is coupled to the arm 27 of the valve 28 by means of a chain 33.

The load carrying trolleys on the main conveyor will each carry a selector mechanism of known type such mechanism being capable of being set so that as the carrier or trolley approaches the junction of said main and branch conveyors it (the mechanism) will be effective to actuate the valves thereby to cause operation of the several rams. In the embodiment illustrated the trolley 13 which incorporates in known manner a depending load bar 34 is provided with an adjustable peg 35 capable of being set to actuate the valves. The particular arrangement shown is however purely exemplary and obviously any other convenient known type of selector means may readily be employed.

It may be mentioned here that it will be necessary in the region of the switch point to remove or cut away a portion of the appropriate track member of the main conveyor 10, i.e. the right hand track member as shown in Figure 2, in order to allow trolleys to pass off the main conveyor and on to the branch conveyor on operation of the switch mechanism.

The apparatus above described is adapted to operate as follows.

Load carriers or trolleys on the main conveyor 10 may be allowed to travel along said main conveyor without being diverted to the branch conveyor. If however a selected carrier or trolley is required to be diverted the selector mechanism associated therewith will be set to contact the actuating arm 27 of the first valve 28 which will be effective to cause operation of the ram 20 and also of the ram 29 which latter will cause projection of the back stop 30 into the path of movement of any following carrier or trolley thereby to prevent further travel of the latter. Operation of the ram 20 will result in the switch device 19 being moved by the lever 21 into a position wherein it will project across the main conveyor so that it will be effective to divert the trolley on to the branch line 15. The selector mechanism on the trolley will also contact the actuating arm 32 of the second valve 31 with consequent supply of air to the ram 23 and angular movement of the transfer arm 17. Upon movement of the arm 17 the pusher dog or abutment 18, which has previously merely pivoted idly to let the selected trolley or carrier pass, will engage the rear of said trolley or carrier and will, due to the continued movement of the arm, positively propel said trolley or carrier which due to the presence in its path of the switch device 19 will thus be pushed on to the branch conveyor.

As the transfer arm 17 approaches the limit of its movement it will contact the peg 25 and thus impart an angular movement to the lever 24 which will be effective to reverse the valve 28 and hence, due to the connection between their respective actuating arms 27 and 32, the valve 31 thereby to cause return to their initial positions of the lever 21, the back stop 30 and the transfer arm 17. Preferably the switch device 19 will have a spring associated therewith in order positively to return the same to its inoperative position on re-setting of the lever 21 but of course such a spring is not absolutely necessary since if the lever 21 is not again actuated as a result of entry of the next following trolley into the zone such trolley will be effective to knock the switch device back into its inoperative position.

It will be appreciated that the lever 24 will by virtue of the chain connection 26 between the arm 24 and the arm 27 be re-set to its initial position shown in full lines in Figure 1 on actuation of the said arm by the next trolley required to be transferred to the branch line.

Although in the foregoing it has been stated that the branch conveyor is of a type similar to that constituting the main conveyor it is to be understood that said branch conveyor may well comprise a so-called "dead line" conveyor. In such a case the endless driven chain would be replaced by a plurality of rollers which are fixedly located in position but are individually freely rotatable. Such rollers would be so arranged as to support load carriers diverted on to the branch conveyor and to provide a roller path therefor along which said carriers may be moved as may be required by hand, by gravity as a result of suitable inclination of the conveyor or by any other convenient means.

What I claim is:

1. In a conveyor ssytem including a main conveyor line and at least one branch conveyor line arranged to diverge from said main conveyor line at a preselected point along the path of the latter, said main conveyor line comprising an endless driven chain on which load carriers are supported in such a manner as to be propelled along by virtue of the friction subsisting between said carriers and the chain, the provision, in the region of the confluence of the main and branch conveyor lines, of a transfer mechanism comprising a switch device movable into an operative position wherein it will be disposed above the chain in the path of any load carrier supported on the main conveyor line and approaching the confluence of said main and branch lines and will be effective to divert such carrier from the former to the latter, an angularly movable transfer arm adapted on actuation to engage and positively to propel any load carrier approaching said confluence, fluid operated ram means for actuating said switch device and said transfer arm and valve means operable by any preselected load carrier to cause operation of said ram means thereby to cause the switch device to assume its operative position and the transfer arm to engage and to propel the selected carrier into contact with said switch device which will be effective with continued movement of said arm to cause said carrier to be diverted on to the branch conveyor line.

2. A transfer mechanism as claimed in claim 1 in which the switch device comprises an arm capable of pivotal movement about a fixed pivot, there being an actuating lever which is coupled to the fluid operated ram means and is adapted on operation of the latter to engage and move the switch device into its operative position, said actuating lever being so dimensioned and arranged in relation to said switch device that on operation it will assume in relation to said switch device a dead centre position such that said device will be positively locked in its operative position.

3. In a conveyor system including a main conveyor line and at least one branch conveyor line arranged to diverge from said main conveyor line at a preselected point along the path of the latter, said main conveyor line comprising an endless driven chain on which load carriers are supported in such a manner as to be propelled along by virtue of the friction subsisting between said carriers and the chain, the provision, in the region of the confluence of the main and branch conveyor lines, of a transfer mechanism comprising a switch device movable into an operative position wherein it will be disposed above the chain in the path of any load carrier supported on the main conveyor line and approaching the confluence of said main and branch lines, an angularly movable transfer arm arranged normally to project across the main conveyor line in an elevated position above the path of any load carrier approaching said confluence, a pusher dog depending from said transfer arm into the path of any such carrier, said dog being freely displaceable by any carrier moving forwardly past said arm but arranged to constitute a rigid abutment capable of pushing a load carrier on angular movement of said arm from its normal position, a first fluid operated ram for effecting movement of the switch device, a second fluid operated ram for effecting movement of the transfer arm, first and second valves respectively controlling the operation of said first and second rams, and an actuating arm associated one with each of said valves, said arms being disposed in the path of travel of a member carried by any selected load carrier so that on being contacted by such member they will be moved to actuate the valves thereby to cause operation of the respective rams with resultant movement of the switch device into its operative position and actuation of the transfer arm so that the pusher dog on the latter will be effective to engage and to propel the load carrier into contact with said switch device which will be effective with continued movement of said arm to cause said carrier to be diverted on the branch conveyor line.

4. A transfer mechanism as in claim 3 in which means are provided which are effective, after a predetermined movement of said transfer arm, to cause resetting of the valves to their initial positions and hence return of the rams and of the switch device and transfer arm to their initial positions.

5. A transfer mechanism as in claim 3 and further comprising a resetting lever which is adapted to be actuated by the transfer arm after a predetermined movement of said arm, said resetting lever being operatively coupled to the first valve so that on actuation it will be effective to reset said first valve to its initial position thereby to cause the ram associated with the switch device to be restored to its initial position, there being means interconnecting the first and second valves whereby resetting of the first valve will result in resetting of the second valve thereby to cause the second ram to restore the transfer arm to its initial position.

6. A transfer mechanism as in claim 3 and further comprising a back stop movable into an operative position wherein it will prevent the passage into the transfer zone of any following carrier, there being a further fluid operated ram for effecting movement of said back stop, the supply of fluid to such ram being controlled by the first valve.

References Cited in the file of this patent

UNITED STATES PATENTS

| | | |
|---|---|---|
| 1,917,837 | Haddlesay | July 11, 1933 |
| 2,101,353 | Waalkes | Dec. 7, 1937 |
| 2,572,011 | Cohen et al. | Oct. 23, 1951 |
| 2,684,039 | King | July 20, 1954 |
| 2,688,935 | Brooks | Sept. 14, 1954 |
| 2,782,727 | King | Feb. 26, 1957 |
| 2,812,724 | King | Nov. 12, 1957 |
| 2,840,006 | Henderson | June 24, 1958 |
| 2,844,105 | King | July 22, 1958 |
| 2,845,034 | Harrison | July 29, 1958 |